United States Patent [19]

Imazeki et al.

[11] 4,296,473
[45] Oct. 20, 1981

[54] PROFILE CONTROL SYSTEM
[75] Inventors: Ryoji Imazeki; Etuo Yamazaki, both of Hachioji, Japan
[73] Assignee: Fujitsu Fanuc Limited, Tokyo, Japan
[21] Appl. No.: 23,459
[22] Filed: Mar. 23, 1979
[30] Foreign Application Priority Data
Mar. 23, 1978 [JP] Japan ............... 53-33397
[51] Int. Cl.³ ........................... G06F 15/46
[52] U.S. Cl. .................. 364/520; 318/578; 364/474
[58] Field of Search ............. 364/474, 105, 117, 520; 318/578, 609, 571, 162; 409/79, 99, 127, 98, 126, 127, 130

[56] References Cited
U.S. PATENT DOCUMENTS

| | | | |
|---|---|---|---|
| 3,624,343 | 11/1971 | Stuernstrom et al. | 318/578 X |
| 3,707,662 | 12/1972 | Hoffman | 318/578 |
| 3,819,999 | 6/1974 | Platt | 318/609 |
| 4,064,446 | 12/1977 | Krohn | 318/578 |
| 4,084,244 | 4/1978 | Floter | 318/578 X |

*Primary Examiner*—Joseph F. Ruggiero
*Attorney, Agent, or Firm*—Staas & Halsey

[57] ABSTRACT

A difference signal corresponding to the difference between the displacement of a stylus of a tracer head and a reference signal is integrated and the sum of the integrated value and the difference signal is applied as an error signal to a command velocity function generator and a correcting velocity function generator to produce a command velocity signal and a correcting velocity signal, respectively, which are provided to a distributing circuit. A displacement direction signal from an index circuit is supplied to the distributing circuit to derive therefrom respective axis command velocity signals for effecting profile control.

4 Claims, 7 Drawing Figures

PROFILE CONTROL SYSTEM

BACKGROUND OF THE INVENTION

1. Field of the Invention

This invention relates to a profile control system which ensures high-precision profile control.

2. Description of the Prior Art

FIG. 1 is a block diagram showing an example of a conventional profile control device. Reference numeral TR indicates tracer head which is provided with a stylus ST for copying a model M, and respective axis displacement components $\epsilon_x$, $\epsilon_y$ and $\epsilon_z$ in response to the three-dimensional displacement $\epsilon$ of the stylus ST are each provided after being amplified by an amplifier AMP. A displacement resultant circuit DG receives the above-said axis displacement components $\epsilon_x$, $\epsilon_y$ and $\epsilon_z$ and operates to provide the displacement $\epsilon = \sqrt{\epsilon_x{}^2 + \epsilon_y{}^2 + \epsilon_z{}^2}$. An adder AD is supplied with the displacement $\epsilon$ and a preset reference signal $\epsilon_0$ to yield a difference signal $\epsilon - \epsilon_0$, which is provided to each of a command velocity function generator ART and a correcting velocity function generator ARN. The function generators ARN and ART respectively produce correcting and command velocity signals $V_N$ and $V_T$ of such characteristics as shown and apply them to a distributing circuit DC.

In the case of plane profiling, the X- and Y-axis displacement components $\epsilon_x$ and $\epsilon_y$ from the tracer head TR are applied to an index circuit IND, in which the following operations are effected:

$$\epsilon_x / \sqrt{\epsilon_x{}^2 + \epsilon_y{}^2} = \sin\theta \tag{1}$$

$$\epsilon_y / \sqrt{\epsilon_x{}^2 + \epsilon_y{}^2} = \cos\theta \tag{2}$$

thereby to obtain displacement direction signals $\sin\theta$ and $\cos\theta$, which are provided to the distribution circuit DC.

In the distribution circuit DC, based on the correcting velocity signal $V_N$, the command velocity signal $V_T$ and the displacement direction signals $\sin\theta$ and $\cos\theta$, X- and Y-axis command velocity signals $V_X$ and $V_Y$ are obtained by the following operations to control the speed of respective servomotors:

$$V_X = V_T \sin\theta + V_N \cos\theta \tag{3}$$

$$V_Y = V_T \cos\theta + V_N \sin\theta \tag{4}$$

In FIG. 1, the output signals $\sin\theta$ and $\cos\theta$ from the index circuit IND are configuration signals of the model M detected by the tracer head TR. Where these signals coincide with the configuration of the model M, the profiling is achieved with the command velocity signal $V_T$ given in the tangential direction of the model M but with no correcting velocity signal $V_N$. That is, the displacement $\epsilon$ of the stylus ST of the tracer head TR is equal to the reference signal $\epsilon_0$ and the resultant velocity V is equal to the command velocity signal $V_T$, i.e. $V = V_T$.

In actual systems, however, owing to the detection accuracy of the tracer head, an influence of friction between the model M and the stylus ST and the operating accuracy of the index circuit IND, the output signals $\sin\theta$ and $\cos\theta$ from the index circuit IND each have an error with respect to the normal direction N of the model M, as shown in FIG. 4. Since the command velocity is yielded in a direction of 90° relative to an angle $\theta$ detected with this error, if the stylus ST on the model M at the command velocity $V_T$, the displacement of the stylus ST decreases by $\Delta\epsilon$ and, to correct it, the correcting velocity $V_N$ is generated to direct the resultant velocity to the normal direction of the model M for normal profiling. Accordingly, profiling is always accompanied by the generation of the error and cannot be achieved with accuracy.

SUMMARY OF THE INVENTION

This invention has for its object to provide a profile control system in which errors due to the detection accuracy of the tracer head, the operation accuracy of the index circuit, etc. are eliminated by the additional provision of a simple circuit to ensure highly accurate profile control.

Briefly stated, in the system of this invention, an error signal based on the displacement of a stylus and a reference signal is applied to a command velocity function generator to provide a command velocity signal and a correcting velocity signal. The command velocity signal and the correcting velocity signal are applied to a distributing circuit which is supplied with a displacement direction signal from an index circuit to produce respective axis command velocity signals, thereby performing profile control. The error signal is the sum of the aforementioned difference signal $\epsilon - \epsilon_0$ between the displacement of the stylus $\epsilon$ and the aforesaid reference signal $\epsilon_0$ and an integrated value $\epsilon_{0c}$ of the difference signal.

DESCRIPTION OF THE PREFERRED EMBODIMENTS

Figure 1:
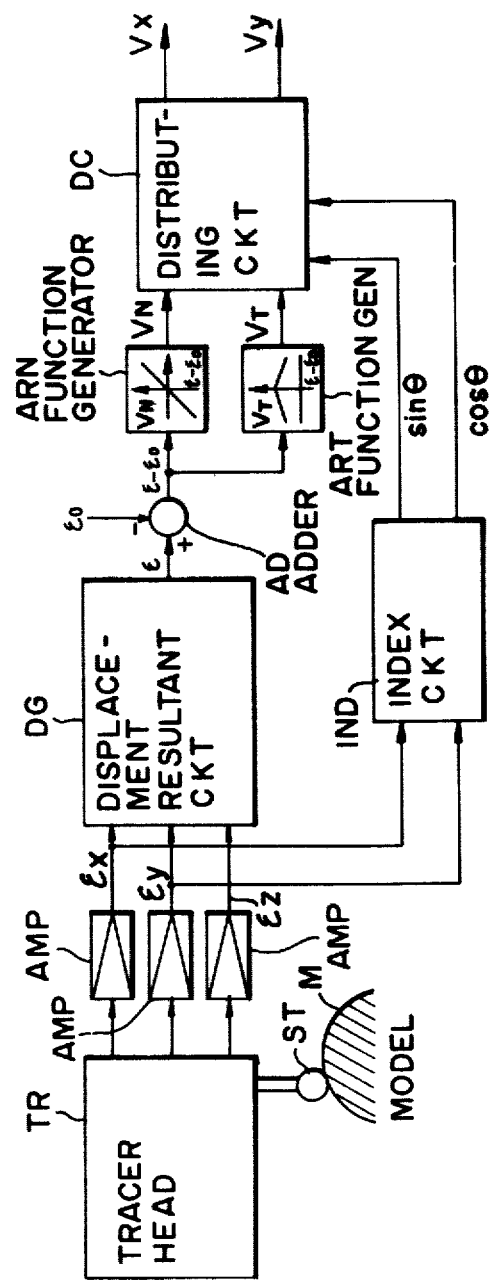
FIG. 1 is a block diagram showing a conventional profile control device.
Figure 2:
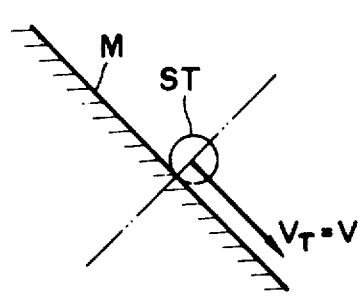
FIGS. 2, 3, 4 and 5 are diagrams explanatory of a known profiling operation.
Figure 3:
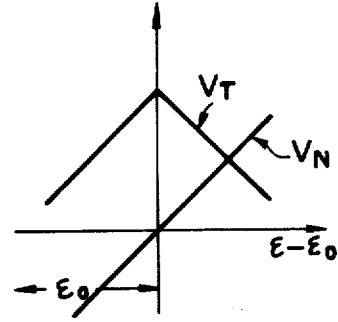
Figure 4:
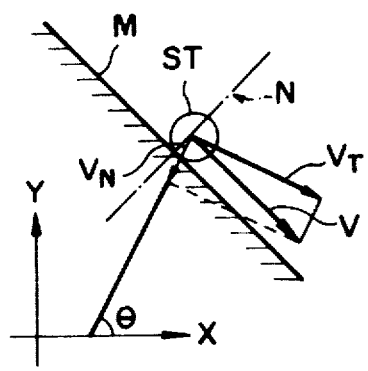
Figure 5:
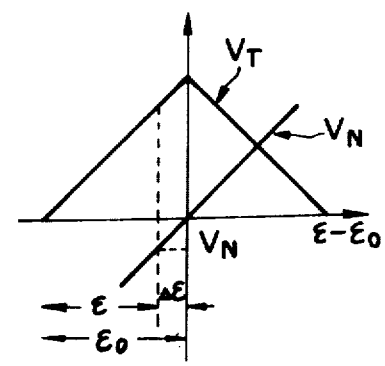
Figure 6:
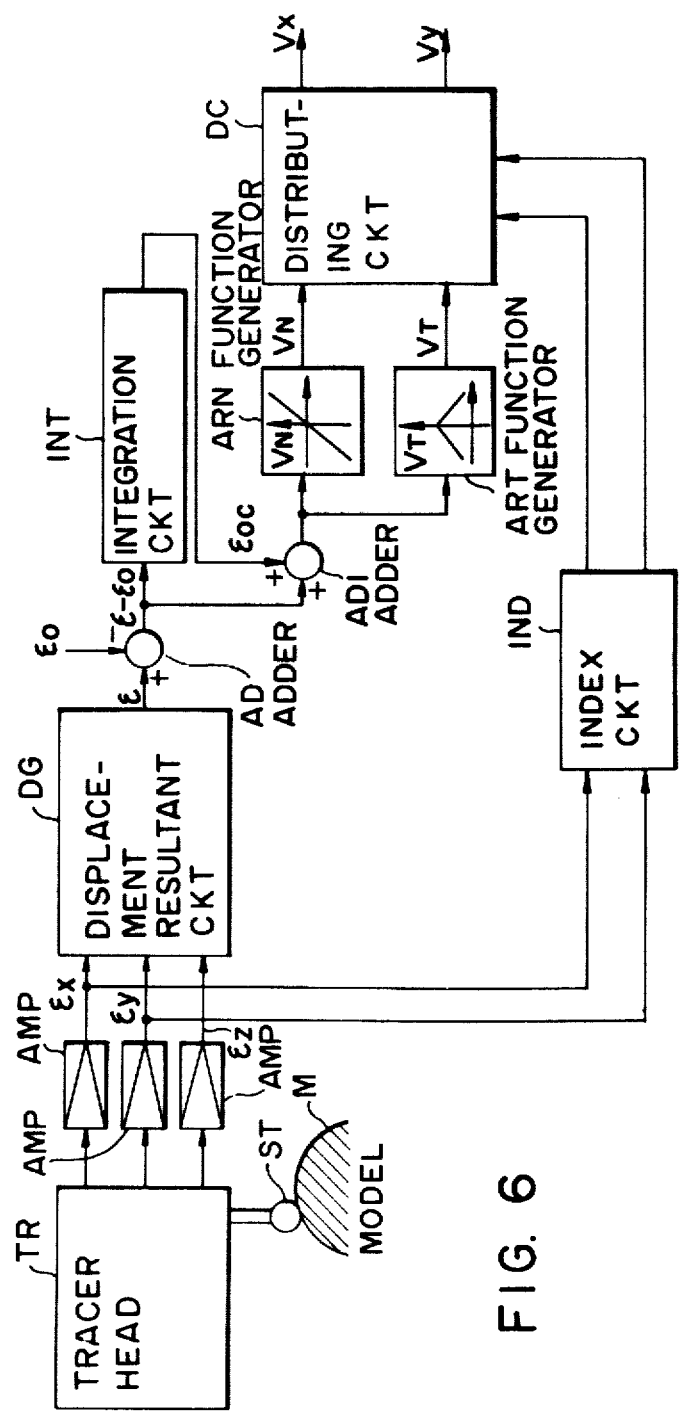
FIG. 6 is a block diagram illustrating an embodiment of this invention.

FIG. 6 shows in block form an embodiment of this invention. A model M is traced by a stylus ST of a tracer head and displacement signals $\epsilon_x$, $\epsilon_y$ and $\epsilon_z$ produced by the displacement of the stylus ST are respectively amplified by amplifiers AMP for input to a displacement resultant circuit DG to obtain a displacement $\epsilon$. The displacement $\epsilon$ and a reference signal $\epsilon_0$ are applied to an adder AD to obtain a difference signal $\epsilon - \epsilon_0$, which is provided to an integration circuit INT and an adder AD1. The integration circuit INT integrates the difference signal $\epsilon - \epsilon_0$ to produce an integrated value $\epsilon_{0c}$, which is supplied to the adder AD1. As a consequence, the adder AD1 yields an error signal $(\epsilon - \epsilon_0) + \epsilon_{0c}$ for input to a command velocity function generator ART and a correcting velocity function generator ARN.

The function generators ART and ARN respectively produce a command velocity signal $V_T$ and a correcting velocity signal $V_N$ depending upon the error signal and applies the velocity signals to a distributing circuit DC. In X-Y plane profiling, the X- and Y-axis displacement signals $\epsilon_x$ and $\epsilon_y$ from the tracer head TR are provided to an index circuit IND to derive therefrom displacement direction signals $\sin\theta$ and $\cos\theta$ respectively following the aforesaid equations (1) and (2), which signals are supplied to the distributing circuit DC.

The distributing circuit DC, based on the correcting and command velocity signals $V_N$ and $V_T$ and the displacement direction signals $\sin\theta$ and $\cos\theta$, provides command velocity signals $V_X$ and $V_Y$ for the X and Y axes to control the speeds of servomotors of the respective axes.

Figure 7:
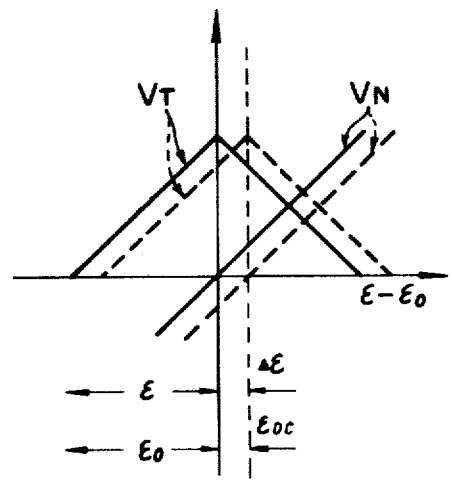
FIG. 7 is a diagram explanatory of the operation of this invention.

The integration circuit INT is formed, for example, with a known Miller integrator, which increases its integrated value positively or negatively depending upon whether the difference signal $\epsilon-\epsilon_0$ is plus or minus and holds a current integrated value when the difference signal $\epsilon-\epsilon_0$ is zero. Accordingly, when the difference signal $\epsilon-\epsilon_0$ is zero, the output from the integration circuit INT holds an amount $\epsilon_{0c}$ corresponding to the aforesaid error $\Delta\epsilon$; therefore, once the signal $\epsilon_{0c}$ has been applied to the function generators ARN and ART, even if the error $\Delta\epsilon$ occurs, as shown in FIG. 7, the amount $\epsilon_{0c}$ corresponding to the error $\Delta\epsilon$ is added to the reference signal $\epsilon_0$ to provide a new reference signal $\epsilon_0+\epsilon_{0c}$. As a result of this, profiling is controlled so that the displacement $\epsilon$ of the stylus ST is always equal to the reference signal $\epsilon_0$.

As is evident from the foregoing, according to this invention, even if the error $\Delta\epsilon$ occurs, the amount $\epsilon_{0c}$ corresponding to the error $\Delta\epsilon$ is added to the reference signal $\epsilon_0$ to provide the value $\epsilon_0+\epsilon_{0c}$ and this value is regarded as a new reference signal, so that the displacement $\epsilon$ of the stylus always remains equal to the reference signal $\epsilon_0$, thus permitting highly accurate profiling.

It will be apparent that many modifications and variations may be effected without departing from the scope of the novel concepts of this invention.

What is claimed is:

1. In a profile control system in which an error signal, based on the difference between the displacement $\epsilon$ relative to a tracer head of a stylus tracing a model with friction therebetween, and a predetermined reference signal $\epsilon_0$, is applied to a command velocity function generator and a correcting velocity function generator to produce a command velocity signal and a correcting velocity signal, and in which a displacement direction signal from an index circuit and the command and correcting velocity signals are provided to a distributing circuit to derive therefrom respective axis command velocity signals for profile control, said axis command velocity signals having error as a result at least of said friction, the improvement comprising:
   integrating means for integrating a difference signal $\epsilon-\epsilon_0$ between said displacement $\epsilon$ of the stylus and said reference signal $\epsilon_0$ to obtain an integrated value $\epsilon_{0c}$, and
   means for applying a signal corresponding to the sum of the integrated value $\epsilon_{0c}$ and the difference signal $\epsilon-\epsilon_0$ as the error signal to said command and correcting velocity function generators for at least partially compensating for said error in said axis command velocity signals.

2. The system of claim 1, said integrating means comprising a Miller integrator.

3. The system of claim 1, said index circuit having limited operating accuracy, and said compensating of said error of said axis command velocity signals comprising compensating error resulting from said limited operating accuracy.

4. The system of claim 1 or 3, said system comprising means for moving said tracer head according to said command velocity control in a direction tangential to the point of contact of the stylus with the model as a result of said compensation of said error.

* * * * *